United States Patent
Yano

(10) Patent No.: US 6,938,178 B2
(45) Date of Patent: Aug. 30, 2005

(54) TERMINAL DEVICE AND REAL-TIME CLOCK CONTROL METHOD THEREFOR ENABLING PRESERVATION OF CLOCK/CALENDAR INFORMATION AND HIGH INFORMATION READOUT SPEED

(75) Inventor: Masatoshi Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 597 days.

(21) Appl. No.: 10/073,161

(22) Filed: Feb. 13, 2002

(65) Prior Publication Data

US 2002/0116658 A1 Aug. 22, 2002

(30) Foreign Application Priority Data

Feb. 16, 2001 (JP) ........................................ 2001-040206

(51) Int. Cl.[7] .............................. G06F 1/04; G06F 1/14
(52) U.S. Cl. ...................................... 713/500; 713/400
(58) Field of Search ............................... 713/1, 2, 100, 713/400, 500, 502, 503, 600

(56) References Cited

U.S. PATENT DOCUMENTS 5,175,699 A * 12/1992 Podkowa et al. ........... 364/569
5,216,357 A * 6/1993 Coppola et al. ............ 324/142
5,941,915 A * 8/1999 Federle et al. .................. 701/1

OTHER PUBLICATIONS

English Translation of the Chinese Office Action dated Oct. 24, 2003.

* cited by examiner

Primary Examiner—Dennis M. Butler
(74) Attorney, Agent, or Firm—McGinn & Gibb, PLLC

(57) ABSTRACT

A terminal device such as a mobile terminal is provided with two real-time clocks which are powered by different power sources: a first real-time clock which is built in a control section (built-in microcomputer 1, for example) of the terminal device; and a second real-time clock which is provided outside the control section. At power-on of the mobile terminal or on recovery from failure such as a power cut, clock/calendar information is read out from the second real-time clock and is set to the first real-time clock, and thereafter, the control section obtains the clock/calendar information from the first real-time clock. The second real-time clock is connected to the control section directly by a signal line or via a functional device, or the second real-time clock is built in a functional device which is connected to the control section. By such composition and operation, the clock/calendar information can be maintained reliably and correctly even if failure occurred to the control section. The readout of the clock/calendar information is carried out usually from the first real-time clock (built-in RTC), therefore, high readout speed can be realized.

20 Claims, 7 Drawing Sheets

F I G. 1
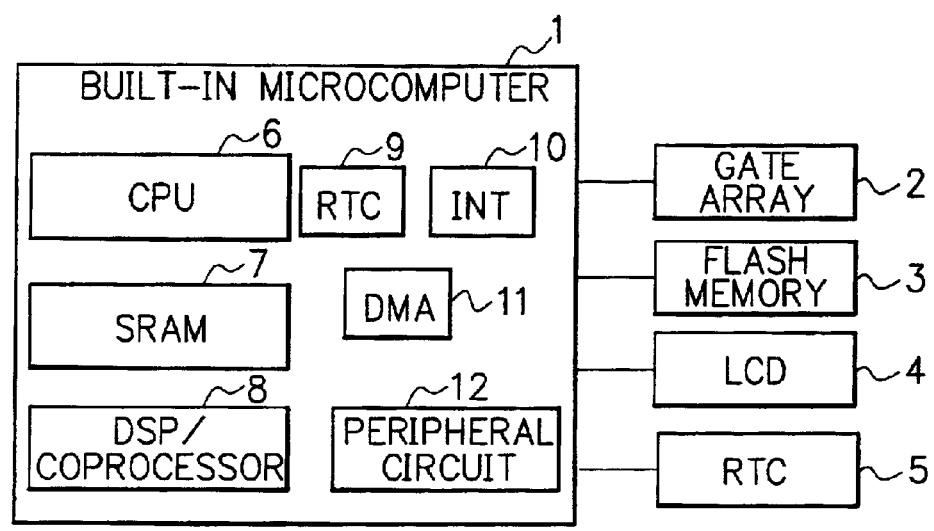

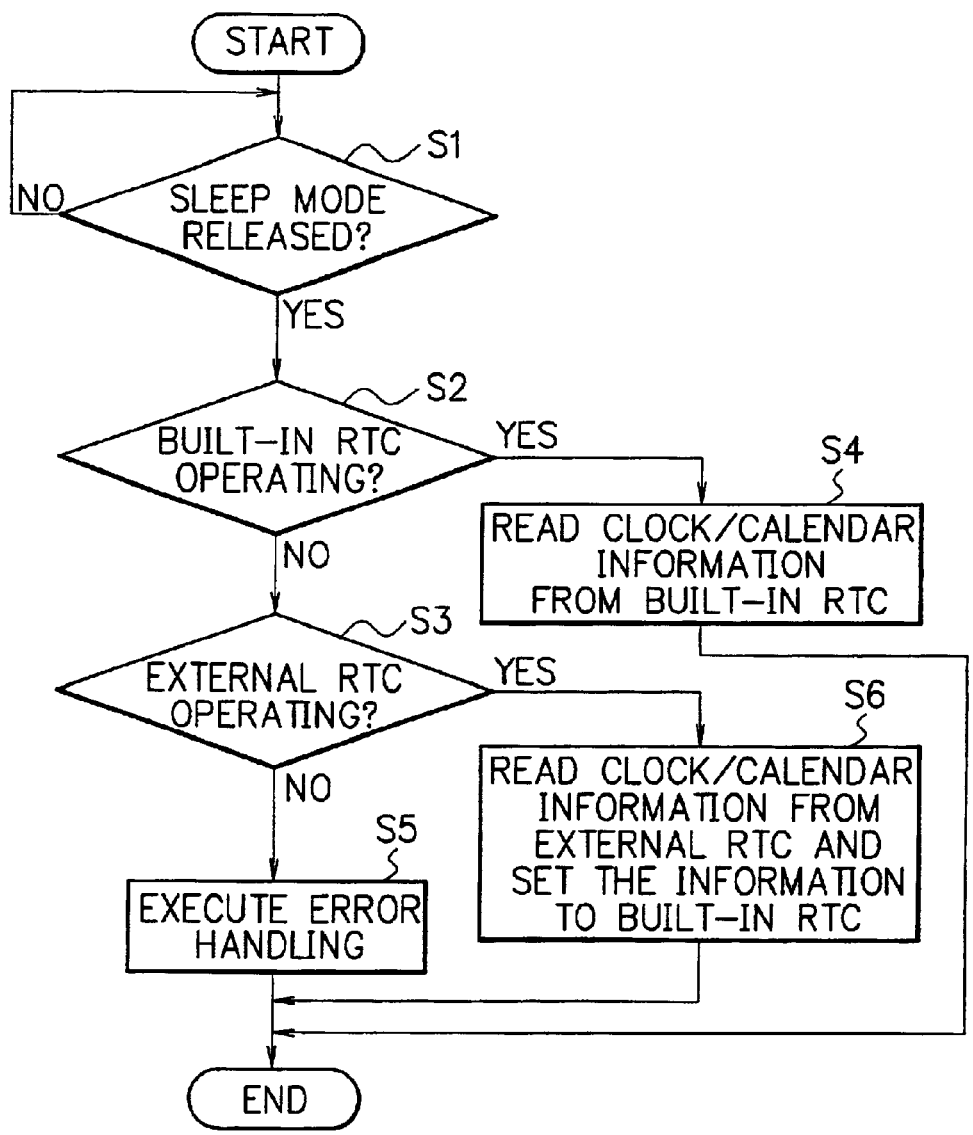

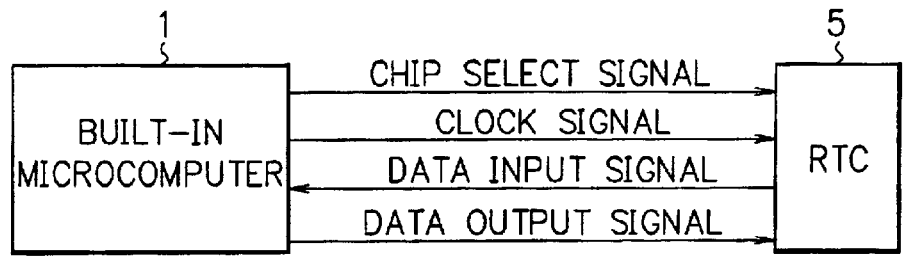
F I G. 3A
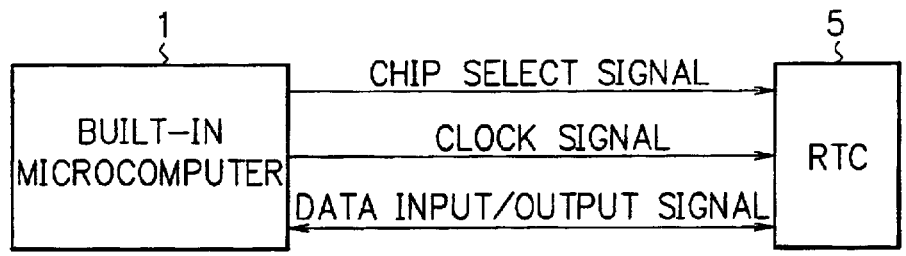
F I G. 3B
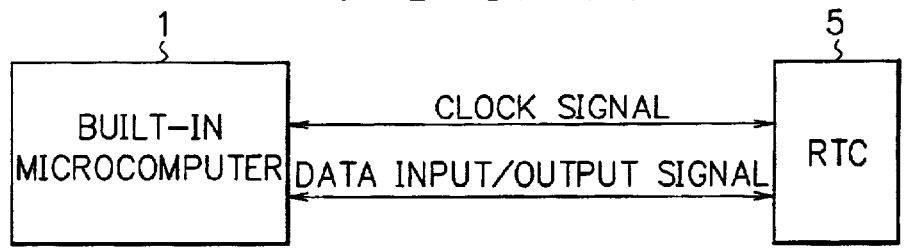
F I G. 3C
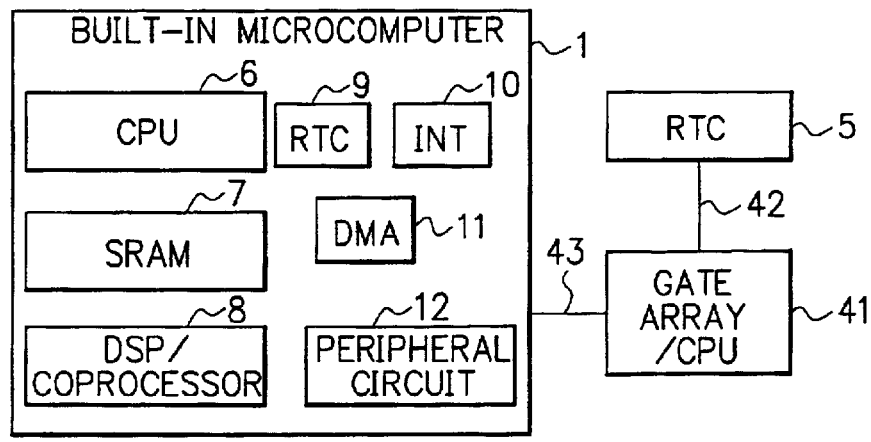
F I G. 4

F I G. 6
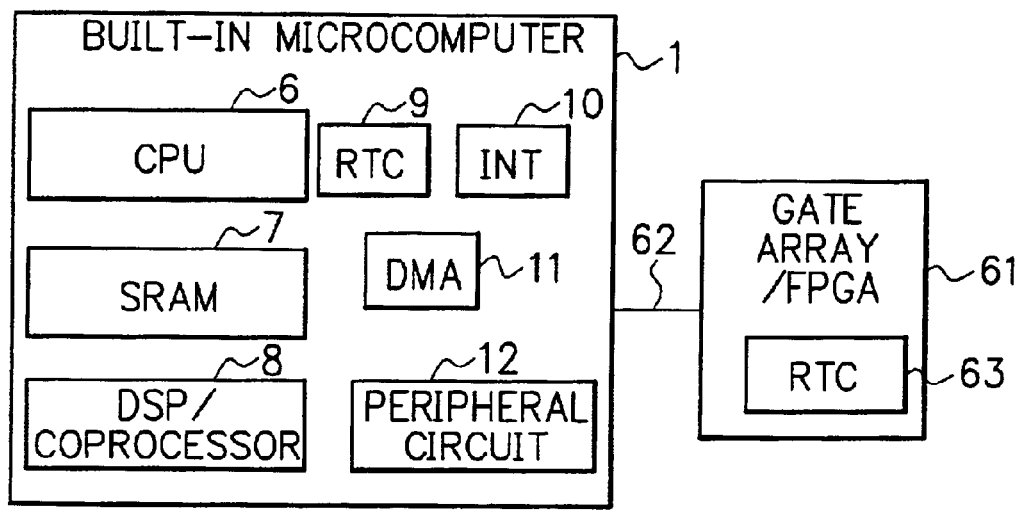

TERMINAL DEVICE AND REAL-TIME CLOCK CONTROL METHOD THEREFOR ENABLING PRESERVATION OF CLOCK/CALENDAR INFORMATION AND HIGH INFORMATION READOUT SPEED

BACKGROUND OF THE INVENTION

The present invention relates to a terminal device having a real-time clock function and a method for controlling the real-time clock.

DESCRIPTION OF THE RELATED ART

The clock/calendar function or clock/calendar display function (a function for holding and displaying clock (time) information and calendar (date) information) of mobile terminals such as portable cellular phones is generally realized by use of an externally-added special-purpose element or device for RTC (Real-Time Clock) or by use of a built-in RTC of a microcomputer which is installed in the mobile terminal (hereafter, referred to as a "built-in microcomputer").

Especially in the case where the built-in RTC of the built-in microcomputer is used, high readout speed of the clock/calendar can be realized without the need of extra space for the installation of the RTC.

However, if failure or abnormality such as a power cut occurred to the built-in microcomputer itself, the clock/calendar function of the built-in RTC might be impaired due to the effect of the failure. There are cases where power source pins and ground pins for the built-in RTC are provided to the built-in microcomputer in order to maintain the function of the built-in RTC. However, in such composition employing the built-in RTC, power source pins and ground pins, power consumption is necessitated to be higher in comparison with the case where an external special-purpose RTC is employed.

Concretely, the power consumption of the external RTC (RICOH Rx5C348A, for example) is as low as 0.35 $\mu$A, whereas that of the built-in RTC amounts to 3 $\mu$A.

If an external RTC and an independent power source for the external RTC are employed, the effect of the failure (such as a power cut) of the built-in microcomputer can be eliminated, however, interrupt signal lines for time update etc. have to be connected to the built-in microcomputer. Therefore, such composition is disadvantageous for device installation and circuit pattern wiring.

Further, the external RTC employs a low-speed serial communication function for the interface to the built-in microcomputer, therefore, the clock/calendar readout speed is necessitated to be slow and thereby processing time of the CPU (Central Processing Unit) of the built-in microcomputer is wasted considerably.

SUMMARY OF THE INVENTION

It is therefore the primary object of the present invention to provide a terminal device and a real-time clock control method for the terminal device by which the clock/calendar function of the terminal device can be maintained and preserved even if failure such as a power cut occurred, with minimum addition of wiring.

Another object of the present invention is to provide a terminal device and a real-time clock control method for the terminal device by which a higher clock/calendar readout speed can be realized.

In accordance with a first aspect of the present invention, there is provided a terminal device comprising a control section for controlling the terminal device, a first real-time clock which is built in the control section, and a second real-time clock which is provided outside the control section. The control section obtains information from the first real-time clock when the terminal device is in a first operation mode, and the control section obtains information from the second real-time clock when the terminal device is in a second operation mode.

In accordance with a second aspect of the present invention, in the first aspect, the second real-time clock is directly connected to the control section by a signal line.

In accordance with a third aspect of the present invention, in the first aspect, the second real-time clock is connected to the control section via a functional device.

In accordance with a fourth aspect of the present invention, in the first aspect, the second real-time clock is built in a functional device which is connected to the control section.

In accordance with a fifth aspect of the present invention, in the first aspect, the information obtained from the second real-time clock is transferred to the first real-time clock and thereafter the control section obtains the information from the first real-time clock.

In accordance with a sixth aspect of the present invention, in the fifth aspect, the information of the first real-time clock is restored by use of the information transferred from the second real-time clock.

In accordance with a seventh aspect of the present invention, in the first aspect, the control section and the second real-time clock are powered by different power sources.

In accordance with an eighth aspect of the present invention, in the first aspect, the information at least includes time information and date information.

In accordance with a ninth aspect of the present invention, in the first aspect, the first operation mode is enabled when the control section is operating normally, and the second operation mode is enabled when the control section recovered from failure.

In accordance with a tenth aspect of the present invention, in the first aspect, the control section is implemented by a microcomputer which is built in the terminal device.

In accordance with an eleventh aspect of the present invention, there is provided a method for controlling a real-time clock of a terminal device, comprising a mode judgment step, a first information obtaining step and a second information obtaining step. In the mode judgment step, it is judged whether the terminal device is in a first operation mode or a second operation mode. In the first information obtaining step, a control section of the terminal device obtains information from a first real-time clock which is built in the control section if the terminal device is in the first operation mode. In the second information obtaining step, the control section obtains information from a second real-time clock which is provided outside the control section if the terminal device is in the second operation mode.

In accordance with a twelfth aspect of the present invention, in the eleventh aspect, the second real-time clock is directly connected to the control section by a signal line.

In accordance with a thirteenth aspect of the present invention, in the eleventh aspect, the second real-time clock is connected to the control section via a functional device.

In accordance with a fourteenth aspect of the present invention, in the eleventh aspect, the second real-time clock is built in a functional device which is connected to the control section.

In accordance with a fifteenth aspect of the present invention, in the eleventh aspect, the information obtained from the second real-time clock is transferred to the first real-time clock and thereafter the control section obtains the information from the first real-time clock.

In accordance with a sixteenth aspect of the present invention, in the fifteenth aspect, the information of the first real-time clock is restored by use of the information transferred from the second real-time clock.

In accordance with a seventeenth aspect of the present invention, in the eleventh aspect, the control section and the second real-time clock are powered by different power sources.

In accordance with an eighteenth aspect of the present invention, in the eleventh aspect, the information at least includes time information and date information.

In accordance with a nineteenth aspect of the present invention, in the eleventh aspect, the first operation mode is enabled when the control section is operating normally, and the second operation mode is enabled when the control section recovered from failure.

In accordance with a twentieth aspect of the present invention, in the eleventh aspect, the control section is implemented by a microcomputer which is built in the terminal device.

BRIEF DESCRIPTION OF THE DRAWINGS

The objects and features of the present invention will become more apparent from the consideration of the following detailed description taken in conjunction with the accompanying drawings, in which:

FIG. 1 is a block diagram showing the composition of the main part of a mobile terminal having an RTC (Real-Time Clock) function in accordance with a first embodiment of the present invention;

FIG. 2 is a flow chart showing a procedure for a real-time clock function of the mobile terminal of the first embodiment;

FIGS. 3A through 3C are schematic diagrams showing signal line connection patterns between an external RTC and a built-in microcomputer of the mobile terminal of the first embodiment;

FIG. 4 is a block diagram showing the composition of the main part of a mobile terminal in accordance with a second embodiment of the present invention;

FIG. 6 is a block diagram showing the composition of the main part of a mobile terminal in accordance with a third embodiment of the present invention;

DESCRIPTION OF THE PREFERRED EMBODIMENTS

Figure 5:
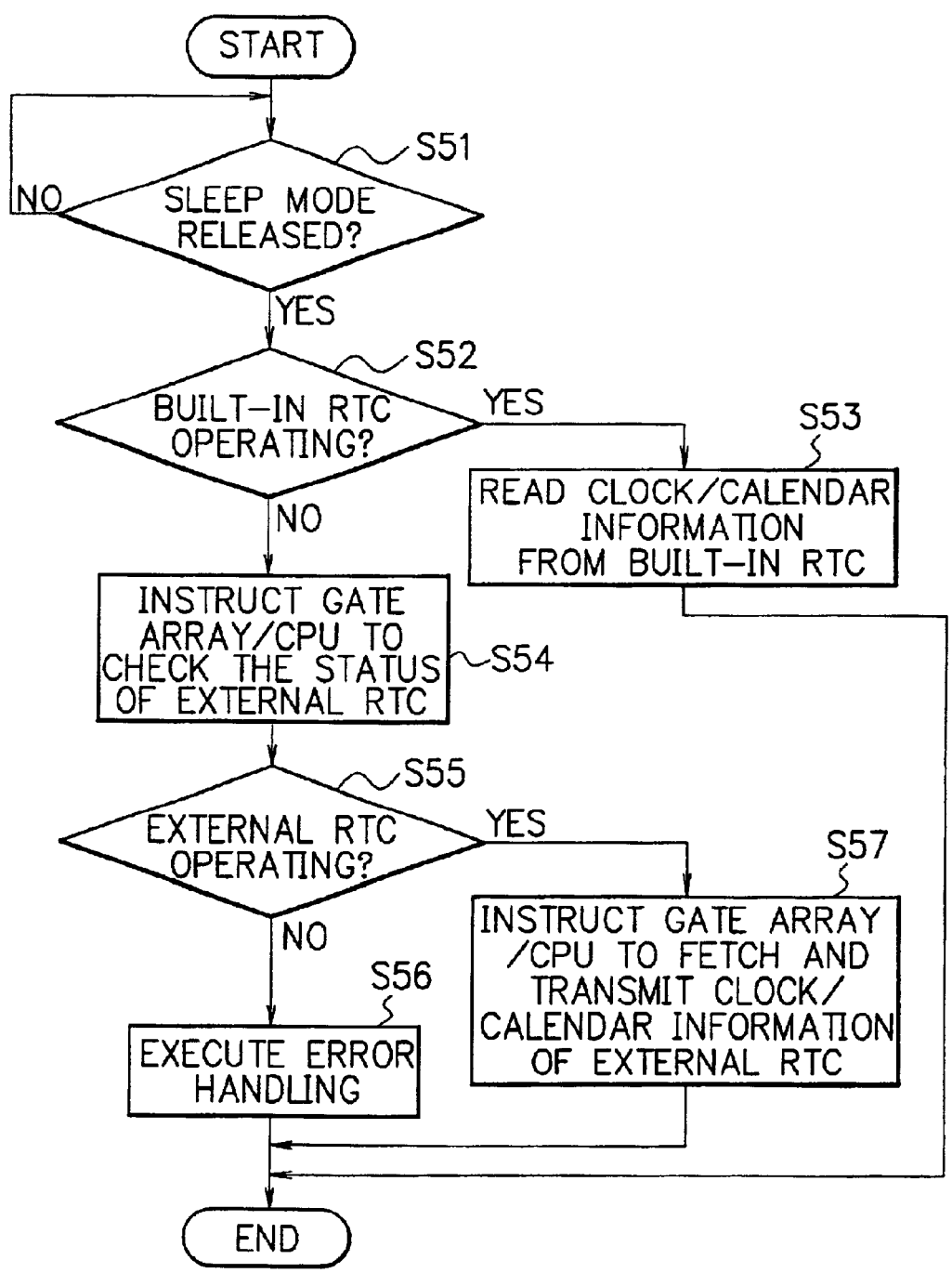
FIG. 5 is a flow chart showing a procedure for a real-time clock function of the mobile terminal of the second embodiment.

Referring now to the drawings, a description will be given in detail of preferred embodiments in accordance with the present invention.

FIG. 1 is a block diagram showing the composition of the main part of a mobile terminal having an RTC (Real-Time Clock) function in accordance with a first embodiment of the present invention. The mobile terminal of FIG. 1 utilizes a built-in microcomputer having a built-in RTC, and the clock/calendar function of the built-in RTC is maintained and preserved by use of an external RTC which is provided outside the built-in microcomputer. The external RTC is powered by a power source that is different from that of the built-in microcomputer.

The built-in microcomputer 1 shown in FIG. 1 includes a CPU (Central Processing Unit) 6 for controlling the whole of the mobile terminal, an SRAM (Static RAM) 7 which is used for temporarily storing control data etc., a DSP (Digital Signal Processor) or coprocessor 8 for carrying out multimedia data processing, and an RTC (Real-Time Clock) 9 for holding clock/calendar information and giving the information to the CPU 6 etc.

The built-in microcomputer 1 further includes an interrupt controller (INT) 10 for controlling and managing internal/external interrupts, a DMA controller 11 for controlling data transfer, and a peripheral circuit 12 including an asynchronous/synchronous serial communication controller, a control circuit for an LCD (Liquid Crystal Display) panel which will be explained later, etc.

Outside the built-in microcomputer 1, a gate array 2, a flash memory 3, an LCD (Liquid Crystal Display) 4 and an RTC (Real-Time Clock) 5 are provided. The gate array 2 implements hardware functions that are not (or that can not be) installed in the built-in microcomputer 1. In the flash memory 3, program code for designating the operation (procedures) of the CPU 6 is stored.

The LCD 4, which operates as a display device of the mobile terminal, displays various necessary information, operation (inputs) by the user, results of the operation, etc. The RTC 5, which is an IC (Integrated Circuit) specially designed for implementing the real-time clock function, supplies reference clock to the built-in microcomputer 1 and holds clock information (time information) and calendar information (date information) of the mobile terminal.

Incidentally, in case where a power cut etc. occurred and thereby the operation of the built-in RTC 9 of the built-in microcomputer 1 stopped, the CPU 6 reads clock/calendar information from the external RTC 5 and sets the information to the built-in RTC 9 according to a program stored in the flash memory 3. Although not shown in FIG. 1, the external RTC 5 and the built-in microcomputer 1 are powered by different power sources.

In the following, the operation of the mobile terminal of the first embodiment will be explained in detail. If the clock/calendar information of the built-in RTC 9 is lost due to failure such as a power cut, the built-in microcomputer 1 on recovery from the failure checks the status of the built-in RTC 9 according to a prescribed program. If the operation and function of the built-in RTC 9 have been stopped, clock/calendar information is read out from the external RTC 5 and the information is set to the built-in RTC 9 of the built-in microcomputer 1, thereby the clock/calendar function, clock/calendar display function etc. of the mobile terminal are restored to their normal states.

FIG. 2 is a flow chart showing a detailed procedure for a real-time clock function of the mobile terminal of the first embodiment. When the mobile terminal is not being used, the built-in microcomputer 1 of the mobile terminal generally stays in its low power consumption mode which is called "sleep mode", and waits for operation by the user (standby state). In a step S1 of FIG. 2, the CPU 6 judges whether or not the sleep mode has been released (ended).

If the sleep mode has been released ("YES" in step S1), the CPU 6 checks the status of the built-in RTC 9 of the built-in microcomputer 1 according to a program stored in the flash memory 3 and thereby judges whether or not the built-in RTC 9 is in its normal operation (step S2). If the built-in RTC 9 is judged to be in normal operation ("YES" in the step S2), the CPU 6 reads out clock/calendar information from the built-in RTC 9 in order to use the information for the clock/calendar display function etc. (step S4).

On the other hand, if the operation of the built-in RTC 9 has been stopped due to some abnormality (failure such as a power cut, for example) ("NO" in the step S2), the CPU 6 checks whether or not the external RTC 5 is in its normal operation (step S3). If the external RTC 5 is in normal operation ("YES" in the step S3), the CPU 6 initializes the built-in RTC 9, reads out clock/calendar information from the external RTC 5, sets the information to the built-in RTC 9, and thereby recovers the clock/calendar function of the mobile terminal (step S6).

If both the built-in RTC 9 and the external RTC 5 have been stopped ("NO" in the step S3), an error handling (for letting the user input clock/calendar information etc.) is carried out by the CPU 6 (step S5). Concretely, messages indicating the occurrence of abnormality in the real-time clock function and the need of input of new information are displayed on the LCD 4.

Incidentally, while the above procedure has been assumed to be carried out on each release (end) of the sleep mode, it is also possible to carry out a similar procedure at each power-on of the mobile terminal.

FIGS. 3A through 3C are schematic diagrams showing signal line connection patterns between the external RTC 5 and the built-in microcomputer 1 of the mobile terminal of the first embodiment. As shown in the figures, the signal line connection between the built-in microcomputer 1 and the external RTC 5 is implemented by the commonly-used synchronous serial connection.

Generally, when an external RTC is employed, the update of the clock/calendar information from the external RTC is realized by letting the external RTC periodically make interrupts to the built-in microcomputer 1, in order to ensure the accuracy of readout time. Similar interrupts from the external RTC to the built-in microcomputer 1 is also employed for the alarm function.

However, in the mobile terminal of the first embodiment, such functions are usually realized by the built-in RTC 9 of the built-in microcomputer 1 while employing the external RTC 5 as backup only. By the use of the external RTC 5 as backup only, interrupt signals become unnecessary and thereby at least a signal wiring pattern corresponding to the interrupt signals becomes unnecessary.

FIG. 3A shows an example of a four-line serial interface which uses four signal lines (for a chip select signal, a clock signal, a data input signal and a data output signal) for the connection between the external RTC 5 and the built-in microcomputer 1. FIG. 3B shows an example of a three-line serial interface which uses three signal lines (for a chip select signal, a clock signal and a data input/output signal) for the connection between the external RTC 5 and the built-in microcomputer 1.

FIG. 3C shows an example of an I²C bus serial interface in accordance with a patented invention of Philips. In the example of FIG. 3C, two bidirectional signal lines (for a clock signal and a data input/output signal) are used for the connection between the external RTC 5 and the built-in microcomputer 1.

As explained above, in the mobile terminal in accordance with the first embodiment of the present invention, an external RTC 5 that is power by an independent power source is connected to the built-in microcomputer 1 having a built-in RTC 9. Clock/calendar information of the external RTC 5 is read out and set to the built-in RTC 9 at power-on of the mobile terminal or on recovery from failure such as a power cut, and thereafter, clock/calendar information is read out from the built-in RTC 9, thereby the clock/calendar information can be maintained and used with reliability.

Generally, if failure such as a power cut occurs to a built-in microcomputer, built-in functions of the built-in microcomputer are also disabled. However, in the first embodiment, the power source of the external RTC 5 is separated from that of the built-in microcomputer 1, and even in the case where the built-in RTC 9 stopped due to such failure, the clock/calendar information is read out from the external RTC 5 and is set to the built-in RTC 9. Therefore, necessary clock/calendar information can be maintained and preserved reliably and correctly even in a mobile terminal that employs a built-in microcomputer having a built-in RTC.

By limiting the use of the external RTC 5 to backup only, the number of signal lines connecting the built-in microcomputer 1 and the external RTC 5 can be minimized and thereby the on-board installation pattern can be simplified. In other words, at least an on-board circuit pattern corresponding to the interrupt signals can be omitted since the interrupt signals for the update of the clock/calendar information become unnecessary.

Even if low-speed serial communication is employed for the interface between the built-in microcomputer 1 and the external RTC 5, the readout of the clock/calendar information from the RTC can be carried out at high speed except in limited situations (on recovery from failure etc.) since the read/write of the clock/calendar information is usually carried out to the built-in RTC 9 of the built-in microcomputer 1.

The aforementioned special-purpose power supply pins and ground pins for maintaining the clock/calendar information of the built-in RTC of the built-in microcomputer are not employed in the mobile terminal of the first embodiment, therefore, the number of pins of the built-in microcomputer for maintaining the built-in RTC can be reduced in comparison with such examples.

Further, by limiting the use of the external RTC 5 to information holding or backup, power consumption can be reduced considerably. Even if the aforementioned special-purpose power supply pins and ground pins for maintaining the clock/calendar information of the RTC were provided and thereby the RTC of the built-in microcomputer could be maintained and preserved, the power consumption of the built-in microcomputer amounts to approximately 3 $\mu$A as mentioned before due to leak currents to other circuits etc. However, if a special purpose external RTC (RICOH Rx5C348A, for example) is employed as in the mobile terminal of the first embodiment, power consumption can be kept below approximately 0.35 $\mu$A, thereby power saving in the mobile terminal can be attained.

The present invention is not to be restricted to the above embodiment but various changes or modifications are possible without departing from the scope and spirit of the present invention. In the following, some other embodiments will be explained in detail referring to figures.

FIG. 4 is a block diagram showing the composition of the main part of a mobile terminal in accordance with a second embodiment of the present invention, in which the same reference characters as those of FIG. 1 designate the same or corresponding parts to those of FIG. 1 and thus repeated description thereof is omitted for brevity.

The key feature of the mobile terminal of the second embodiment is the indirect connection between the built-in microcomputer 1 and the external RTC 5 via a gate array, a CPU or the like (hereafter, referred to as a "gate array/CPU 41"). On each of signal lines 43 (between the built-in microcomputer 1 and the gate array/CPU 41) and 42 (between the gate array/CPU 41 and the external RTC 5), data is transferred by means of serial communication.

FIG. 5 is a flow chart showing a detailed procedure for a real-time clock function of the mobile terminal of the second embodiment. In a step S51 of FIG. 5, the CPU 6 judges whether or not the sleep mode of the mobile terminal has been released (ended), similarly to the first embodiment.

If the sleep mode has been released ("YES" in step S51), the CPU 6 checks the status of the built-in RTC 9 of the built-in microcomputer 1 according to the program stored in the flash memory 3 and thereby judges whether or not the built-in RTC 9 is in its normal operation (step S52). If the built-in RTC 9 is judged to be in normal operation ("YES" in the step S52), the CPU 6 reads out clock/calendar information from the built-in RTC 9 in order to use the information for the clock/calendar display function etc. (step S53).

On the other hand, if the operation of the built-in RTC 9 has been stopped due to some abnormality (failure such as a power cut, for example) ("NO" in the step S52), the CPU 6 instructs the gate array/CPU 41 to check the status of the external RTC 5 (step S54). If the external RTC 5 is judged to be in its normal operation ("YES" in the step S55), the CPU 6 instructs the gate array/CPU 41 to fetch and transmit the clock/calendar information of the external RTC 5 (step S57).

If both the built-in RTC 9 and the external RTC 5 have been stopped ("NO" in the step S55), an error handling (for letting the user input clock/calendar information etc.) is carried out by the CPU 6 similarly to the first embodiment (step S56).

As described above, in the mobile terminal in accordance with the second embodiment of the present invention, a gate array/CPU 41 is provided between the built-in microcomputer 1 and the external RTC 5. Such connection between the built-in microcomputer 1 and the external RTC 5 is advantageous especially when the built-in microcomputer 1 is short of channels for serial communication.

FIG. 6 is a block diagram showing the composition of the main part of a mobile terminal in accordance with a third embodiment of the present invention, in which the same reference characters as those of FIG. 1 designate the same or corresponding parts to those of FIG. 1 and thus repeated description thereof is omitted for brevity.

The mobile terminal of the third embodiment is characterized by an RTC 63 which is formed in a gate array or FPGA (Field Programmable Gate Array) (hereafter, referred to as a "gate array/FPGA 61") which is connected to the built-in microcomputer 1 via a signal line 62. The RTC 63 can also be regarded as an external RTC of the built-in microcomputer 1.

Figure 7:
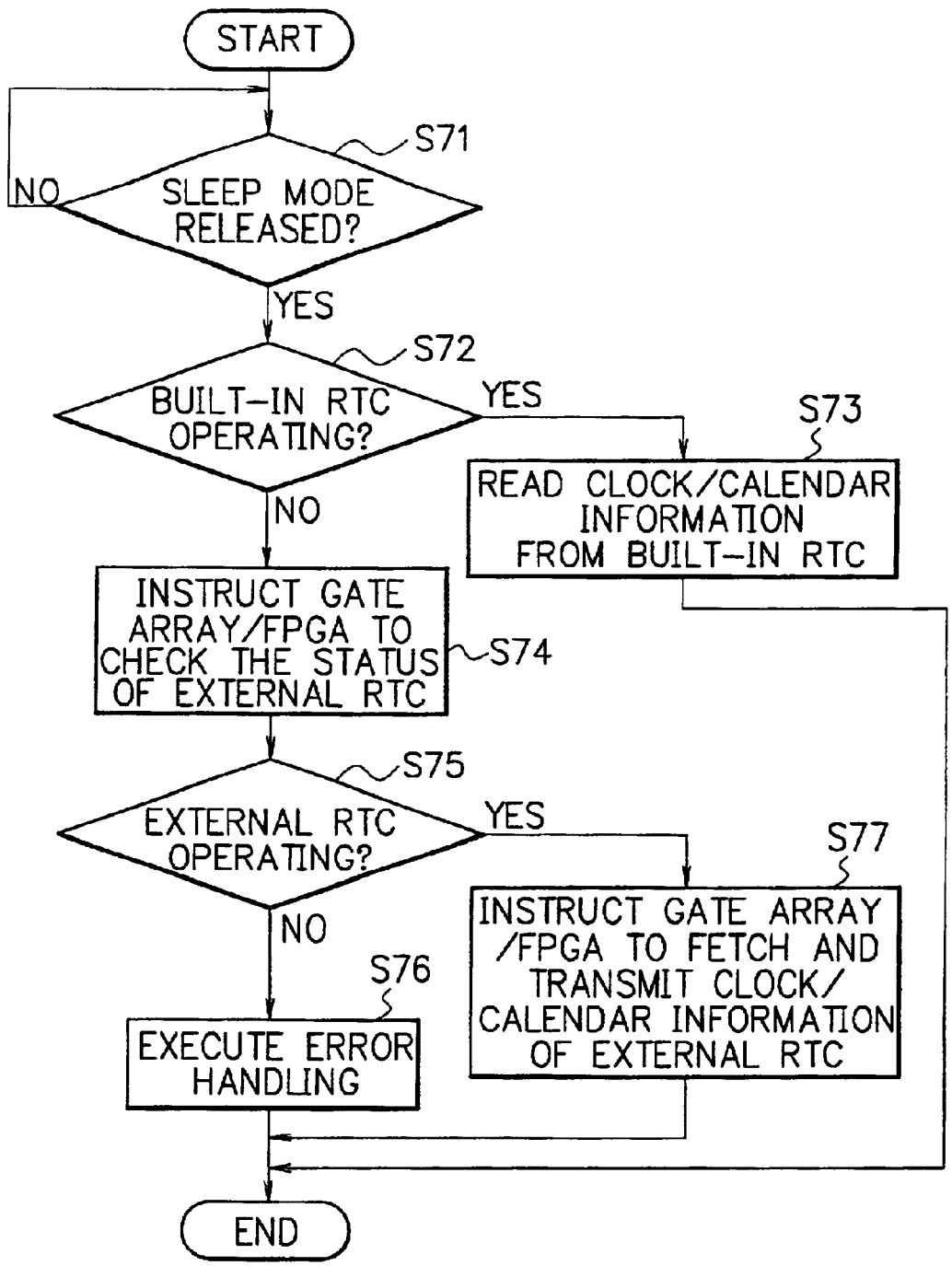
FIG. 7 is a flow chart showing a procedure for a real-time clock function of the mobile terminal of the third embodiment.

FIG. 7 is a flow chart showing a detailed procedure for a real-time clock function of the mobile terminal of the third embodiment. The procedure of FIG. 7 is a little different from that of FIG. 5 (second embodiment) in that the CPU 6 of the third embodiment gives an instruction to the gate array/FPGA 61 via the signal line 62 so as to check the status of the RTC 63 inside the gate array/FPGA 61 (step S74) and the CPU 6 instructs the gate array/FPGA 61 to transmit the clock/calendar information of the RTC 63 (step S77). Other steps of FIG. 7 are the same as those of FIG. 5. The steps S71, S72, S73, S75 and S76 of FIG. 7 correspond to the steps S51, S52, S53, S55 and S56 of FIG. 5, respectively.

As described above, in the mobile terminal in accordance with the third embodiment of the present invention, an RTC is formed in a gate array or FPGA which is connected to the built-in microcomputer, and the clock/calendar information of the RTC of the gate array/FPGA is obtained by the built-in microcomputer for backup. By such composition, elements/parts installation area/space in the mobile terminal can be reduced efficiently.

Figure 8:
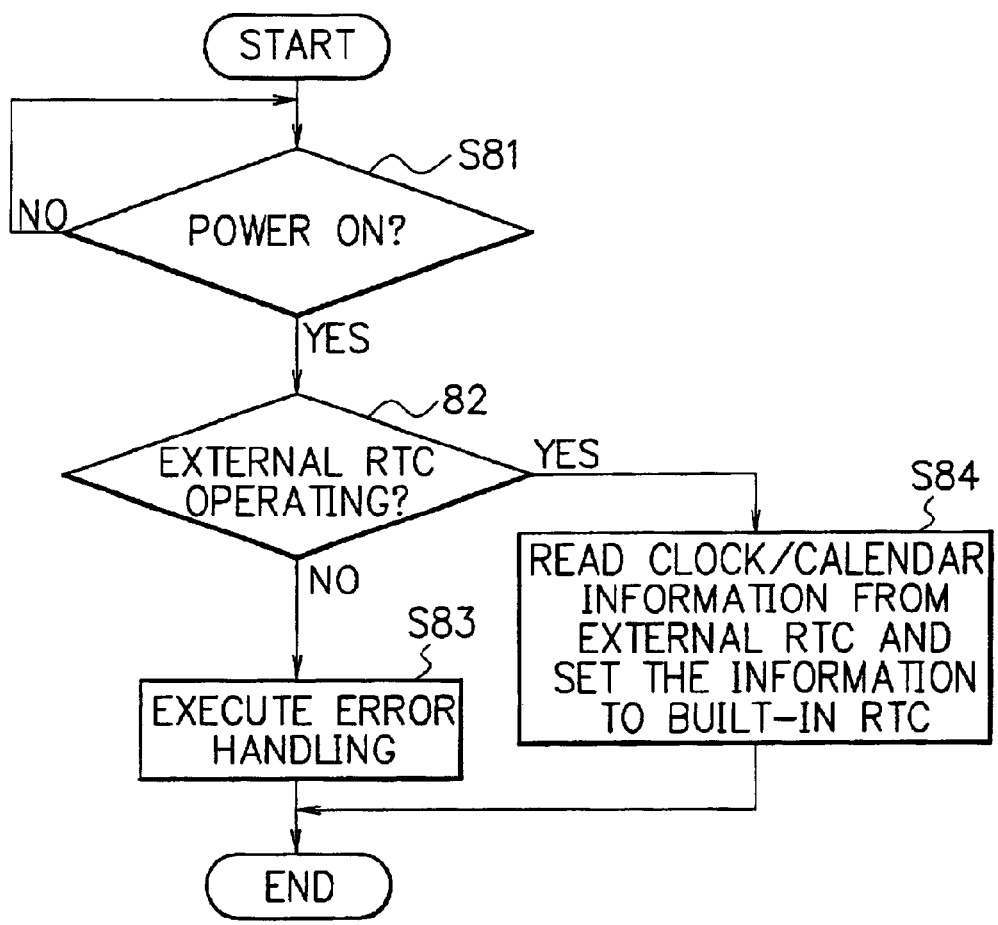
FIG. 8 is a flow chart showing a procedure for a real-time clock function which is employed by a mobile terminal in accordance with a fourth embodiment of the present invention.

FIG. 8 is a flow chart showing a procedure for a real-time clock function which is employed by a mobile terminal in accordance with a fourth embodiment of the present invention. The mobile terminal of the fourth embodiment can be implemented by use of the main part which has been shown in FIG. 1 (first embodiment), FIG. 4 (second embodiment) or FIG. 6 (third embodiment), therefore, a figure and explanation of the main part of the mobile terminal of the fourth embodiment are omitted for brevity.

In a step S81 of FIG. 8, the CPU 6 judges whether or not the power of the mobile terminal has been turned on. If the power has been turned on ("YES" in the step S81), the CPU 6 checks the status of the external RTC and thereby judges whether or not the external RTC is in its normal operation (step S82). If the external RTC is in normal operation ("YES" in the step S82), the CPU 6 reads out clock/calendar information from the external RTC and sets the information to the built-in RTC 9 of the built-in microcomputer 1 (step S84).

On the other hand, if the operation of the external RTC has been stopped ("NO" in the step S82), an error handling (for letting the user input clock/calendar information etc.) is carried out by the CPU 6 (step S83).

As described above, in the mobile terminal in accordance with the fourth embodiment of the present invention, the readout of the clock/calendar information from the external RTC is carried out not on each release (end) of the sleep mode but at each power-on of the mobile terminal, therefore, power consumption of the mobile terminal can be reduced further.

As set forth hereinabove, in the terminal device (such as a mobile terminal) and the real-time clock control method for the terminal device in accordance with the present invention, a control section (the built-in microcomputer 1, for example) of the terminal device obtains information from a first real-time clock which is built in the control section if the terminal device is in a first operation mode, and the control section obtains information from a second real-time clock which is provided outside the control section if the terminal device is in a second operation mode, thereby information such as the clock/calendar information can be maintained reliably and correctly.

The information obtained from the second real-time clock is transferred to the first real-time clock, and thereafter the control section obtains the information from the first real-time clock. Therefore, the readout of the clock/calendar information can be carried out at high speed.

The connection between the control section and the second real-time clock can be realized in various ways. The second real-time clock can be connected to the control section of the terminal device directly by a signal line or via a functional device, or the second real-time clock can be built in a functional device which is connected to the control section. By such composition, it is possible to minimize the number of signal lines between the control section and the second real-time clock and simplify the on-board installation pattern.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A terminal device comprising:
   a control section for controlling the terminal device;
   a first real-time clock which is built in the control section; and
   a second real-time clock which is provided outside the control section, wherein:
   the control section is further responsive to the terminal device being in a first operation mode to obtain real-time information from the first real-time clock, and
   the control section is further responsive to the terminal device being in a second operation mode to obtain real-time information from the second real-time clock.

2. A terminal device as claimed in claim 1, further comprising a signal line directly connecting the second real-time clock to the control section.

3. A terminal device as claimed in claim 1, further comprising a functional device connecting the second real-time clock to the control section.

4. A terminal device as claimed in claim 1, further comprising a functional device having the second real-time clock built therein.

5. A terminal device as claimed in claim 1, wherein the control section is further responsive to the terminal device changing from the second operation mode to the first operation mode to transfer the real-time information obtained from the second real-time clock to the first real-time clock and thereafter to obtain the real-time information from the first real-time clock.

6. A terminal device as claimed in claim 5, wherein the control section is further responsive to the real-time information obtained from the second real time clock being transferred to the first real-time clock to restore the real-time information of the first real-time clock by use of the real-time information transferred from the second real-time clock.

7. A terminal device as claimed in claim 1, further comprising a first power source for powering the control section and a second power source for powering the second real-time clock.

8. A terminal device as claimed in claim 1, wherein the real-time information comprises time information and date information.

9. A terminal device as claimed in claim 1, wherein:
   the terminal device is responsive to the control section operating normally to enable the first operation mode; and
   the terminal device is responsive to the control section operating other than normally to enable the second operation mode.

10. A terminal device as claimed in claim 1, wherein the control section comprises a microcomputer which is built in the terminal device.

11. A method for controlling a real-time clock of a terminal device, comprising:
    judging whether the terminal device is in a first operation mode or a second operation mode;
    when the terminal device is in the first operation mode, activating a control section of the terminal device to obtain real-time information from a first real-time clock which is built in the control section; and
    when the terminal device is in the second operation mode, activating the control section to obtain real-time information from a second real-time clock which is provided outside the control section.

12. A method as claimed in claim 11, wherein the second real-time clock is directly connected to the control section by a signal line.

13. A method as claimed in claim 11, wherein the second real-time clock is connected to the control section via a functional device.

14. A method as claimed in claim 11, wherein the second real-time clock is built in a functional device which is connected to the control section.

15. A method as claimed in claim 11, further comprising, when the terminal device changes from the second operation mode to the first operation mode, transferring the real-time information obtained from the second real-time clock to the first real-time clock, and thereafter obtaining real-time information from the first real-time clock.

16. A method as claimed in claim 15, further comprising restoring the real-time information of the first real-time clock by use of the real-time information transferred from the second real-time clock.

17. A method as claimed in claim 11, further comprising powering the control section by a first power source, and powering the second real-time clock by a second power source.

18. A method as claimed in claim 11, wherein the real-time information comprises time information and date information.

19. A method as claimed in claim 11, further comprising:
    when the control section is operating normally, enabling the first operation mode; and
    when the control section is operating other than normally, enabling the second operation mode.

20. A method as claimed in claim 11, wherein the control section comprises a microcomputer which is built in the terminal device.

* * * * *